(12) United States Patent
Liang (10) Patent No.: US 9,924,535 B2
(45) Date of Patent: Mar. 20, 2018

(54) SERVICE SCHEDULING METHOD AND BASE STATION

(71) Applicant: Huawei Technologies Co., Ltd., Shenzhen (CN)

(72) Inventor: Zijun Liang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 100 days.

(21) Appl. No.: 15/047,908

(22) Filed: Feb. 19, 2016

(65) Prior Publication Data

US 2016/0165634 A1 Jun. 9, 2016

Related U.S. Application Data

(63) Continuation of application No. PCT/CN2013/081966, filed on Aug. 21, 2013.

(51) Int. Cl.
*H04J 3/00* (2006.01)
*H04J 3/08* (2006.01)
*H04W 72/12* (2009.01)
*H04W 72/04* (2009.01)

(52) U.S. Cl.
CPC ..... *H04W 72/1289* (2013.01); *H04W 72/042* (2013.01); *H04W 72/12* (2013.01)

(58) Field of Classification Search
CPC ................................................ H04W 72/1289
See application file for complete search history.

(56) References Cited

U.S. PATENT DOCUMENTS

| 7,394,765 | B2 | 7/2008 | Yi et al. | |
|---|---|---|---|---|
| 2004/0017813 | A1* | 1/2004 | Gulati | H04L 12/40091 370/395.4 |
| 2009/0137252 | A1 | 5/2009 | Masseroni et al. | |
| 2010/0215006 | A1 | 8/2010 | Ho et al. | |
| 2011/0164664 | A1 | 7/2011 | Torsner et al. | |

FOREIGN PATENT DOCUMENTS

| CN | 1972462 A | 5/2007 |
|---|---|---|
| CN | 101296027 A | 10/2008 |
| EP | 2613468 A1 | 7/2013 |
| WO | 2004100637 A2 | 11/2004 |

OTHER PUBLICATIONS

LG Information and Communications, LTD.: "MAC Assisted Dynamic Radio Access Bearer Control," TSG-RAN Working Group 2 (Radio Layer 2 and Radio Layer 3), TSGR2#5(99)624, Jul. 5-9, 1999, 7 pages, Sophia Antipolis.

* cited by examiner

Primary Examiner — Gerald Smarth
(74) Attorney, Agent, or Firm — Slater Matsil, LLP (57) ABSTRACT

Embodiments disclose a service scheduling method and a base station. The method includes reporting, by a Medium Access Control (MAC) entity of a carrier, bearer information of the carrier to a Radio Link Control RLC entity; and allocating, by the RLC entity, service data and control information to the carrier, and sending the service data and the control information to a data buffer of the carrier. The method also includes determining, by the MAC entity, a user equipment that needs to be scheduled, and acquiring the service data and the control information from the data buffer; and performing, by the MAC entity, RLC packet assembly and MAC packet assembly on the service data, and sending the service data experiencing the packet assembly to the user equipment.

18 Claims, 3 Drawing Sheets

SERVICE SCHEDULING METHOD AND BASE STATION

This application is a continuation of International Application No. PCT/CN2013/081966, filed on Aug. 21, 2013, which is hereby incorporated by reference in its entirety.

TECHNICAL FIELD

Embodiments of the present invention relates to the field of communications technologies, and in particular, to a service scheduling method and a base station.

BACKGROUND

In a Long Term Evolution (LTE) system, a user equipment (UE) may transmit and receive data over multiple carriers (Component Carrier, CC) by using a carrier aggregation (CA) technology, thereby achieving a better balance between carriers and improving network performance. The carriers may also be called component carriers or carrier units.

In an existing base station eNB, a Packet Data Convergence Protocol (PDCP) entity and a Radio Link Control (RLC) entity are managed in a centralized manner, and scheduling of a Medium Access Control (MAC) entity and a layer 1 (L1) entity are managed in a decentralized manner. In a multicarrier scenario (for example, N carriers are available), the PDCP entity and the RLC entity may be deployed on a same board (typically a baseband board) with one carrier, and other carriers are separately deployed on different boards. The maximum number of carriers that is supported by a current LTE standard is used as an example, when a peak rate of a single user equipment is 3 Gbps, a Radio Link Control entity of the user equipment outputs a data volume of 3 megabits during a transmission time interval (TTI); if only one carrier and the RLC entity are on a same board, the volume of data outputted to other boards is 2.4 megabits. If transmission delay is 100 ms as required, a bandwidth required for data transmission between boards is 24 Gbps. If 3 sectors are considered to be supported, a higher bandwidth is required for data transmission between boards.

Currently it is rather difficult for a baseband unit (BBU) in a base station to meet such a high bandwidth requirement.

SUMMARY

In view of this, embodiments provide a service scheduling method and a base station, so as to solve a problem that a rather high bandwidth is required for transmission between boards.

According to a first aspect, a service scheduling method is provided. The method includes reporting, by a Medium Access Control (MAC) entity of a carrier, bearer information of the carrier to a Radio Link Control RLC entity; and allocating, by the RLC entity, service data and control information to the carrier, and sending the service data and the control information to a data buffer of the carrier. The method also includes determining, by the MAC entity, a user equipment that needs to be scheduled, and acquiring the service data and the control information from the data buffer; and performing, by the MAC entity, RLC packet assembly and MAC packet assembly on the service data and sending the service data experiencing the packet assembly to the user equipment.

In a first possible implementation manner of the first aspect, the bearer information includes at least one of the following: quality of a channel corresponding to the carrier, a load of the carrier, and a rate that the carrier can provide for all user equipment.

In a second possible implementation manner of the first aspect, the control information is a number of a logical channel, a sequence number, or a data length of the service data.

With reference to the first aspect or the first or second possible implementation manner of the first aspect, in a third possible implementation manner, the allocating, by the RLC entity, service data and control information to the carrier is specifically: allocating, by the RLC entity, the service data and the control information to the carrier according to the bearer information, a data buffer status of the carrier, and a buffer status of the RLC entity.

In a fourth possible implementation manner of the first aspect, the performing, by the MAC entity, RLC packet assembly on the service data is specifically: if radio link control packet data unit segment RLC PDU segment packet assembly is performed during a previous transmission time interval TTI, performing RLC PDU Segment packet assembly; if only one sequence number SN is left currently and the service data cannot all be allocated in a current TTI at a time, performing RLC PDU segment packet assembly; and in a situation rather than the preceding two situations, performing radio link control packet data unit RLC PDU packet assembly.

According to a second aspect, a service scheduling method is provided. The method includes reporting, by a Medium Access Control (MAC) entity of a carrier, bearer information of the carrier to a Radio Link Control RLC entity; and allocating, by the RLC entity, service data and control information to the carrier, and sending the service data and the control information to a data buffer of an RLC agent. The method also includes determining, by the MAC entity, a user equipment that needs to be scheduled; and acquiring, by the MAC entity, the service data and the control information from the data buffer of the RLC agent and sending the service data to the user equipment.

In a first possible implementation manner of the second aspect, the bearer information includes at least one of the following: quality of a channel corresponding to the carrier, a load of the carrier, and a rate that the carrier can provide for all user equipment.

In a second possible implementation manner of the second aspect, the control information is a number of a logical channel, a sequence number, or a data length of the service data.

With reference to the second aspect or the first or second possible implementation manner of the second aspect, in a third possible implementation manner, the allocating, by the RLC entity, service data and control information to the carrier is specifically: allocating, by the RLC entity, the service data and the control information to the carrier according to the bearer information, a data buffer status of the RLC agent, and a buffer status of the RLC entity.

In a fourth possible implementation manner of the second aspect, the acquiring, by the MAC entity, the service data and the control information from the data buffer of the RLC agent and sending the service data to the user equipment is specifically: sending, by the MAC entity, a service data allocation request to the RLC agent, and performing, by the RLC agent, RLC packet assembly on the service data and sending it to the MAC entity; and performing, by the MAC entity, MAC packet assembly on the service data experiencing the RLC packet assembly and sending it to the user equipment; or, sending, by the MAC entity, a service data allocation request to the RLC agent and receiving the service data of the user equipment from the RLC agent; and performing, by the MAC entity, RLC packet assembly and MAC packet assembly on the service data of the user equipment and sending the service data experiencing the MAC packet assembly to the user equipment.

With reference to the fourth possible implementation manner of the second aspect, in a fifth possible implementation manner, the performing, by the RLC agent or the MAC entity, RLC packet assembly on the service data is specifically: if radio link control packet data unit segment RLC PDU segment packet assembly is performed during a previous transmission time interval TTI, performing RLC PDU Segment packet assembly; if only one sequence number SN is left currently and the service data cannot all be allocated in a current TTI at a time, performing RLC PDU segment packet assembly; and in a situation rather than the preceding two situations, performing radio link control packet data unit RLC PDU packet assembly.

According to a third aspect, a base station is provided. The base station includes a carrier and a Radio Link Control RLC entity, where the carrier includes a Medium Access Control MAC entity and a data buffer. The MAC entity is configured to report bearer information of the carrier to the RLC entity. The RLC entity is configured to allocate service data and control information to the carrier and send the service data and the control information to the data buffer. The MAC entity is further configured to determine a user equipment that needs to be scheduled, acquire the service data and the control information from the data buffer, perform RLC packet assembly and MAC packet assembly on the service data, and send the service data experiencing the packet assembly to the user equipment.

In a first possible implementation manner of the third aspect, the bearer information of the carrier includes at least one of the following: quality of a channel corresponding to the carrier, a load of the carrier, and a rate that the carrier can provide for all user equipments.

In a second possible implementation manner of the third aspect, the control information is a number of a logical channel, a sequence number, or a data length of the service data.

With reference to the third aspect or the first or second possible implementation manner of the third aspect, in a third possible implementation manner, the allocating, by the RLC entity, service data and control information to the carrier is specifically: allocating, by the RLC entity, the service data and the control information to the carrier according to the bearer information, a data buffer status of the carrier, and a buffer status of the RLC entity.

With reference to the third possible implementation manner of the third aspect, in a fourth possible implementation manner, the performing, by the MAC entity, RLC packet assembly on the service data is specifically: if radio link control packet data unit segment RLC PDU segment packet assembly is performed during a previous transmission time interval TTI, performing RLC PDU Segment packet assembly; if only one sequence number SN is left currently and the service data cannot all be allocated in a current TTI at a time, performing RLC PDU segment packet assembly; and in a situation rather than the preceding two situations, performing radio link control packet data unit RLC PDU packet assembly.

According to a fourth aspect, a base station is provided. The base station includes a carrier, a Radio Link Control RLC entity, and an RLC agent, where the carrier includes a Medium Access Control MAC entity. The MAC entity is configured to report bearer information of the carrier to the RLC entity. The RLC entity is configured to allocate service data and control information to the carrier and send the service data and the control information to the RLC agent for buffering. The RLC agent is configured to buffer the service data and the control information. The MAC entity is further configured to determine a user equipment that needs to be scheduled, acquire the service data and the control information from the RLC agent, and send the service data to the user equipment.

In a first possible implementation manner of the fourth aspect, the bearer information includes at least one of the following: quality of a channel corresponding to the carrier, a load of the carrier, and a rate that the carrier can provide for all user equipment.

In a second possible implementation manner of the fourth aspect, the control information is a number of a logical channel, a sequence number, or a data length of the service data.

With reference to the fourth aspect or the first or second possible implementation manner of the fourth aspect, in a third possible implementation manner, the allocating, by the RLC entity, service data and control information to the carrier is specifically: allocating, by the RLC entity, the service data and the control information to the carrier according to the bearer information, a buffer status of the RLC agent, and a buffer status of the RLC entity.

In a fourth possible implementation manner of the fourth aspect, the acquiring, by the MAC entity, the service data and the control information from the data buffer of the RLC agent and sending the service data to the user equipment is specifically: sending, by the MAC entity, a service data allocation request to the RLC agent, and performing, by the RLC agent, RLC packet assembly on the service data and sends it to the MAC entity; and performing, by the MAC entity, MAC packet assembly on the service data experiencing the RLC packet assembly and sending it to the user equipment; or, sending, by the MAC entity, a service data allocation request to the RLC agent and receiving the service data of the user equipment from the RLC agent; and performing, by the MAC entity, RLC packet assembly and MAC packet assembly on the service data of the user equipment and sending the service data experiencing the MAC packet assembly to the user equipment.

With reference to the fourth possible implementation manner of the fourth aspect, in a fifth possible implementation manner, the performing, by the RLC agent or the MAC entity, RLC packet assembly on the service data is specifically: if radio link control packet data unit segment RLC PDU segment packet assembly is performed during a previous transmission time interval TTI, performing RLC PDU Segment packet assembly; if only one sequence number SN is left currently and the service data cannot all be allocated in a current TTI at a time, performing RLC PDU segment packet assembly; and in a situation rather than the preceding two situations, performing radio link control packet data unit RLC PDU packet assembly.

In the foregoing solutions, an RLC entity allocates service data in advance for a carrier according to information, such as bearer information, reported by an MAC entity, and sends the service data to a data buffer of the carrier or an RLC agent. When the MAC entity needs to schedule a user equipment, it directly reads the service data from the data buffer. This implements decoupling between service data transmission from the RLC entity to the MAC entity and service scheduling by the MAC entity and prevents that a rather high bandwidth is required between boards.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solutions in the embodiments of the present invention may be, directly or after an adaptive change, applied to various wireless communications systems, for example: a Global System for Mobile Communications (GSM), a General Packet Radio Service (GPRS) system, a Code Division Multiple Access (CDMA) system, a CDMA2000 system, a Wideband Code Division Multiple Access (WCDMA) system, and a Long Term Evolution (LTE) system.

Figure 1:
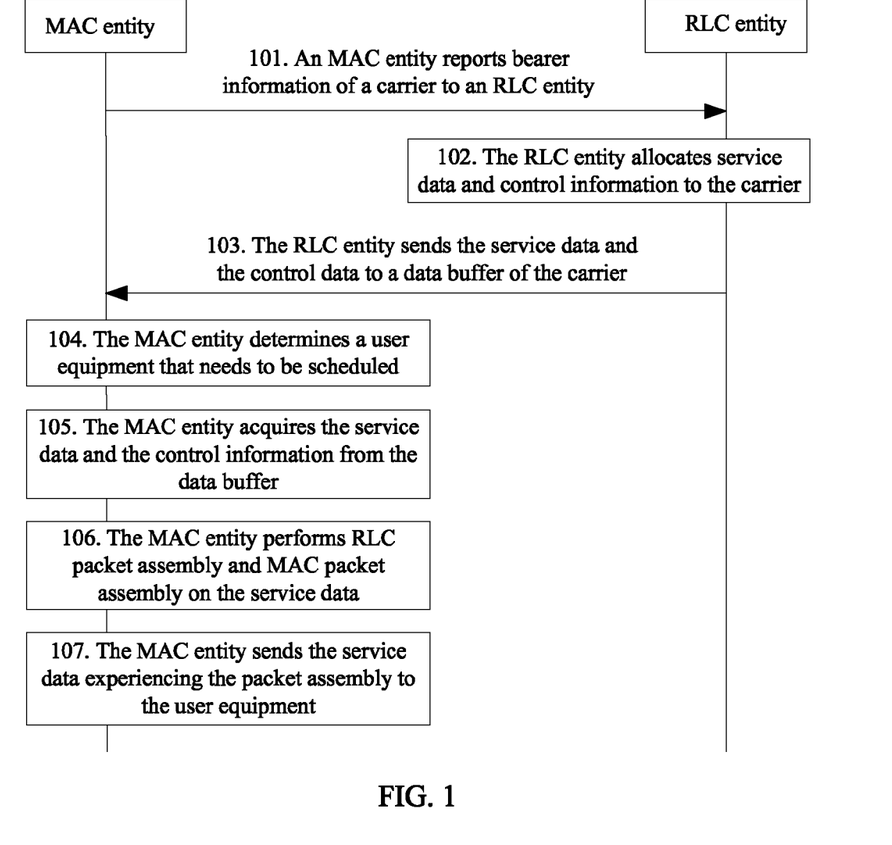
FIG. 1 is a flowchart of a service scheduling method according to an embodiment.

FIG. 1 is a flowchart of a service scheduling method according to an embodiment. In this embodiment, a multi-carrier scenario with N available carriers is used as an example. An RLC entity may be deployed with one carrier on a same board, typically a baseband board, and other carriers CCs are separately deployed on different boards, where other carriers are all configured with a data buffer. For simplicity, FIG. 1 provides only a process of an interaction between one of the carriers and an RLC entity. As shown in FIG. 1, the service scheduling method includes the following steps.

101. An MAC entity of a carrier CC reports bearer information of the carrier to the RLC entity.

The bearer information includes at least one of the following: quality of a channel corresponding to the carrier, a load of the carrier, a rate that the carrier can provide for a user equipment, and the like.

It should be noted that in this embodiment, the carriers all refer to carriers available for the user equipment. In a multicarrier scenario, a base station may configure and activate one or more carriers for the user equipment, and the carriers available for the user equipment include the foregoing activated carriers and a primary carrier (the primary carrier does not need to be activated).

In this embodiment, the RLC entity may also be another service entity having a service scheduling function.

102. The RLC entity allocates service data and control information to the carrier.

The control information mainly refers to header information, such as a number of a logical channel, a sequence number, or a data length of the service data, required for performing RLC packet assembly on the service data.

The allocating, by the RLC entity, service data and control information to the carrier may be specifically: allocating, by the RLC entity, the service data and the control information to the carrier according to the bearer information, a data buffer status of the carrier, and a buffer status of the RLC entity.

Further specifically, it may be that when the quality of the channel corresponding to the carrier is relatively good, the RLC entity allocates more data and corresponding control information to the carrier, and when the channel quality is relatively bad, the RLC entity allocates less data and even does not allocate data. Certainly, the RLC may further determine, according to a factor such as the load of the carrier and the rate that the carrier can provide for the user equipment, volume of service data allocated to the carrier. This is not limited in this embodiment.

It should be noted that the RLC entity may allocate data to multiple carriers simultaneously. In this embodiment, only one of the carriers is used as an example, but is not intended to limit the present invention.

103. The RLC entity sends the service data and the control data to a data buffer of the carrier.

The RLC entity may further send an identifier of the carrier or an identifier of the user equipment to the carrier for buffering.

104. The MAC entity determines a user equipment that needs to be scheduled.

The determining, by the MAC entity, a user equipment that needs to be scheduled may be specifically: collecting, by the MAC entity, an ACK or NACK message fed back from the user equipment and when an ACK is received, it considers that the user equipment needs to be scheduled.

In this embodiment, the MAC entity may schedule multiple user equipment simultaneously. In this embodiment, only one user equipment is used as an example, but is not intended to limit the present invention.

105. The MAC entity acquires the service data and the control information from the data buffer.

106. The MAC entity performs RLC packet assembly and MAC packet assembly on the service data.

The performing, by the MAC entity, RLC packet assembly on the service data may be specifically classified into the following several situations: (1) if radio link control packet data unit segment (Radio Link Control Packet Data Unit segment, RLC PDU segment) packet assembly is performed during a previous transmission time interval (Transmission Time Interval, TTI), performing RLC PDU Segment packet assembly; (2) if only one sequence number (Sequence Number, SN) is left currently and the service data cannot all be allocated in a current TTI at a time, performing RLC PDU segment packet assembly; and (3) in a situation rather than the preceding two situations, performing RLC PDU packet assembly.

107. The MAC entity sends the service data experiencing the packet assembly to the user equipment.

In this embodiment, an RLC entity allocates service data in advance for a carrier according to information, such as bearer information, reported by an MAC entity, and sends the service data to a data buffer of the carrier. When the MAC entity needs to schedule a user equipment, it directly reads the service data from the data buffer. This implements decoupling between service data transmission from the RLC entity to the MAC entity and service scheduling by the MAC entity and prevents that a rather high bandwidth is required between boards.

Figure 2:
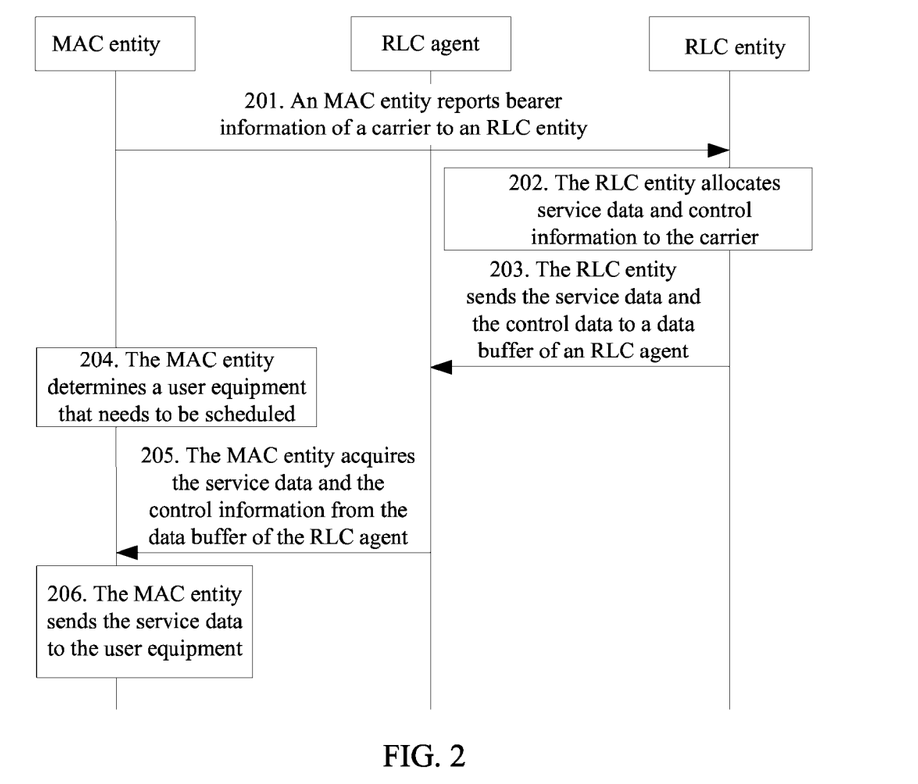
FIG. 2 is a flowchart of another service scheduling method according to an embodiment.

FIG. 2 is a flowchart of another service scheduling method according to an embodiment. An application scenario is similar to the preceding embodiment, but an RLC agent is added between a carrier and an RLC entity, where the RLC agent is configured with a data buffer, and carriers CCs may not be configured with a data buffer. As shown in FIG. 2, the service scheduling method includes the following steps:

201. An MAC entity of a carrier CC reports bearer information of the carrier to the RLC entity.

The bearer information includes at least one of the following: quality of a channel corresponding to the carrier, a load of the carrier, a rate that the carrier can provide for a user equipment, and the like.

In this embodiment, carriers all refer to carriers available for the user equipment. In a multicarrier scenario, a base station may configure and activate one or more carriers for the user equipment, and the carriers available for the user equipment include the foregoing activated carriers and a primary carrier (the primary carrier does not need to be activated).

In this embodiment, the RLC entity may also be another service entity having a service scheduling function.

202. The RLC entity allocates service data and control information to the carrier.

The control information mainly refers to header information, such as a number of a logical channel, a sequence number, or a data length of the service data, required for performing RLC packet assembly on the service data.

The allocating, by the RLC entity, service data and control information to the carrier may be specifically: allocating, by the RLC entity, the service data and the control information to the carrier according to the bearer information, a data buffer status of the RLC agent, and a buffer status of the RLC entity.

Further specifically, it may be that when the quality of the channel corresponding to the carrier is relatively good, the RLC entity allocates more data and corresponding control information to the carrier, and when the channel quality is relatively bad, the RLC entity allocates less data and even does not allocate data. Certainly, the RLC may further determine, according to a factor such as the load of the carrier and the rate that the carrier can provide for the user equipment, volume of service data allocated to the carrier. This is not limited in this embodiment.

It should be noted that the RLC entity may allocate data to multiple carriers simultaneously. In this embodiment, only one of the carriers is used as an example, but is not intended to limit the present invention.

203. The RLC entity sends the service data and the control data to the data buffer of the RLC agent.

The RLC entity may further send an identifier of the carrier or an identifier of the user equipment to the RLC agent for buffering.

204. The MAC entity determines a user equipment that needs to be scheduled.

The determining, by the MAC entity, a user equipment that needs to be scheduled may be specifically: collecting, by the MAC entity, an ACK or NACK message fed back from the user equipment and when an ACK is received, it considers that the user equipment needs to be scheduled.

In this embodiment, the MAC entity may schedule multiple user equipments simultaneously. In this embodiment, only one user equipment is used as an example, but is not intended to limit the present invention.

205. The MAC entity acquires the service data and the control information from the data buffer of the RLC agent.

In this embodiment, the RLC agent may buffer service data and control information for multiple user equipments. In this embodiment, only one user equipment is used as an example, but is not intended to limit the present invention.

206. The MAC entity sends the service data to the user equipment.

The steps 205-206 may be specifically: the MAC entity sends a service data allocation request to the RLC agent, and the RLC agent performs RLC packet assembly on the service data and sends it to the MAC entity; and the MAC entity performs MAC packet assembly on the service data experiencing the RLC packet assembly and sends it to the user equipment; or, the MAC entity sends a service data allocation request to the RLC agent and receives the service data of the user equipment from the RLC agent; and the MAC entity performs RLC packet assembly and MAC packet assembly on the service data of the user equipment and sends the service data experiencing the MAC packet assembly to the user equipment.

In this embodiment, the performing RLC packet assembly on the service data of the user equipment may be specifically classified into the following several situations: (1) if RLC PDU segment packet assembly is performed during a previous transmission time interval (Transmission Time Interval, TTI), performing RLC PDU Segment packet assembly; (2) if only one sequence number (Sequence Number, SN) is left currently and the service data cannot all be allocated in a current TTI at a time, performing RLC PDU segment packet assembly; and (3) in a situation rather than the preceding two situations, performing RLC PDU packet assembly.

In this embodiment, an RLC entity allocates service data in advance for a carrier according to information, such as bearer information, reported by an MAC entity, and sends the service data to an RLC agent for buffering. When the MAC entity needs to schedule a user equipment, it directly reads the service data from the data buffer. This implements decoupling between service data transmission from the RLC entity to the MAC entity and service scheduling by the MAC entity and prevents that a rather high bandwidth is required between boards.

The method provided by the embodiment of the present invention may be applied between different boards inside a baseband unit BBU of a base station, and may also be applied between two or more baseband processing unit BBUs.

Embodiments further provide an apparatus embodiment that implements the methods or steps of the foregoing method embodiments. Details of a part of the steps are not described in detail in the apparatus embodiment. Reference may be made to the foregoing method embodiments.

Figure 3:
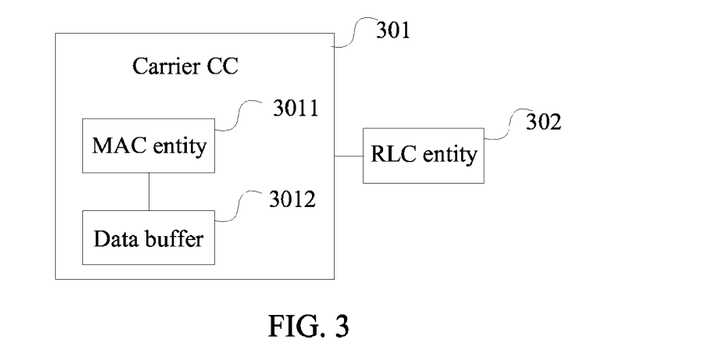
FIG. 3 is a schematic structural diagram of a base station according to an embodiment.

FIG. 3 is a schematic structural diagram of a base station according to an embodiment of the present invention. As shown in FIG. 3, the base station includes: a carrier CC301 and an RLC entity 302, where the carrier CC301 includes an MAC entity 3011 and a data buffer 3012.

The MAC entity 3011 is configured to report bearer information of the carrier CC301 to the RLC entity 302; the RLC entity 302 is configured to allocate service data and control information to the carrier and send the service data and the control information to the data buffer 3012; and the MAC entity 3011 is further configured to determine a user equipment that needs to be scheduled, acquire the service data and the control information from the data buffer 3012, perform RLC packet assembly and MAC packet assembly on the service data, and send the service data experiencing the packet assembly to the user equipment.

In this embodiment, the bearer information of the carrier includes at least one of the following: quality of a channel corresponding to the carrier, a load of the carrier, a rate that the carrier can provide for a user equipment, and the like.

The RLC entity may also be another service entity having a service scheduling function.

The control information mainly refers to header information, such as a number of a logical channel, a sequence number, or a data length of the service data, required for performing the RLC packet assembly on the service data.

The allocating, by the RLC entity 302, service data and control information to the carrier may be specifically: allocating, by the RLC entity, the service data and the control information to the carrier according to the bearer information, a data buffer status of the carrier, and a buffer status of the RLC entity.

The performing, by the MAC entity 3011, RLC packet assembly on the service data may be specifically classified into the following several situations: (1) if RLC PDU segment packet assembly is performed during a previous transmission time interval (Transmission Time Interval, TTI), performing RLC PDU Segment packet assembly; (2) if only one sequence number (Sequence Number, SN) is left currently and the service data cannot all be allocated in a current TTI at a time, performing RLC PDU segment packet assembly; and (3) in a situation rather than the preceding two situations, performing RLC PDU packet assembly.

In the base station according to this embodiment, an RLC entity allocates service data in advance for a carrier according to information, such as bearer information, reported by an MAC entity, and sends the service data to a data buffer of the carrier. When the MAC entity needs to schedule a user equipment, it directly reads the service data from the data buffer. This implements decoupling between service data transmission from the RLC entity to the MAC entity and service scheduling by the MAC entity and prevents that a rather high bandwidth is required between boards.

Figure 4:
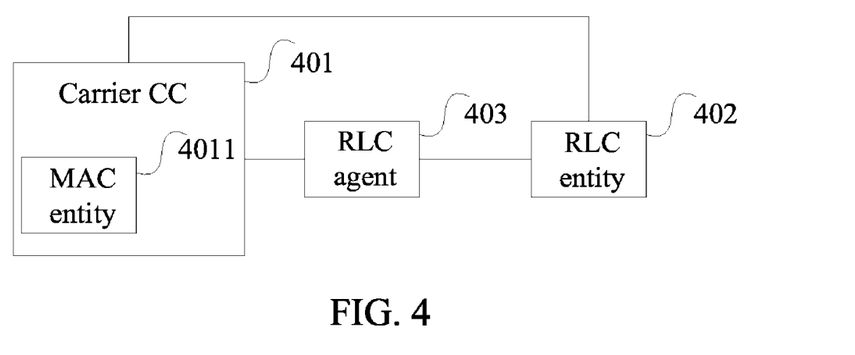
FIG. 4 is a schematic structural diagram of another base station according to an embodiment.

FIG. 4 is a schematic structural diagram of another base station according to an embodiment of the present invention. As shown in FIG. 4, the base station includes: a carrier CC401, an RLC entity 402, and an RLC agent 403, where the CC401 includes an MAC entity 4011.

The MAC entity 4011 is configured to report bearer information of the carrier CC401 to the RLC entity 402; the RLC entity 402 is configured to allocate service data and control information to the carrier and further configured to send the service data and the control information to the RLC agent 403 for buffering; the RLC agent 403 is configured to buffer the service data and the control information; and the MAC entity 4011 is further configured to determine a user equipment that needs to be scheduled, acquire the service data and the control information from the RLC agent 403, and send the service data to the user equipment.

In this embodiment, the bearer information of the carrier includes at least one of the following: quality of a channel corresponding to the carrier, a load of the carrier, a rate that the carrier can provide for a user equipment, and the like.

The RLC entity may also be another service entity having a service scheduling function.

The control information mainly refers to header information, such as a number of a logical channel, a sequence number, or a data length of the service data, required for performing RLC packet assembly on the service data.

The allocating, by the RLC entity, service data and control information to the carrier may be specifically: allocating, by the RLC entity, the service data and the control information to the carrier according to the bearer information, a data buffer status of the carrier, and a buffer status of the RLC entity.

The determining, by the MAC entity, a user equipment that needs to be scheduled may be specifically: collecting, by the MAC entity, an ACK or NACK message fed back from the user equipment and when an ACK is received, it considers that the user equipment needs to be scheduled.

The acquiring, by the MAC entity 4011, the service data and the control information from the RLC agent 403 and sending the service data to the user equipment may be specifically: sending, by the MAC entity, a service data allocation request to the RLC agent, and performing, by the RLC agent, RLC packet assembly on the service data and sending it to the MAC entity; and performing, by the MAC entity, MAC packet assembly on the service data experiencing the RLC packet assembly and sending it to the user equipment; or, sending, by the MAC entity, a service data allocation request to the RLC agent and receiving the service data of the user equipment from the RLC agent; and performing, by the MAC entity, RLC packet assembly and MAC packet assembly on the service data of the user equipment and sending the service data experiencing the MAC packet assembly to the user equipment.

In this embodiment, the performing, by the RLC agent or the MAC entity, RLC packet assembly on the service data of the user equipment may be specifically classified into the following several situations: (1) if RLC PDU segment packet assembly is performed during a previous transmission time interval (Transmission Time Interval, TTI), performing RLC PDU Segment packet assembly; (2) if only one sequence number (Sequence Number, SN) is left currently and the service data cannot all be allocated in a current TTI at a time, performing RLC PDU segment packet assembly; and (3) in a situation rather than the preceding two situations, performing RLC PDU packet assembly.

In this apparatus embodiment, an RLC entity allocates service data in advance for a carrier according to information, such as bearer information, reported by an MAC entity, and sends the service data to an RLC agent for buffering. When the MAC entity needs to schedule a user equipment, it directly reads the service data from the data buffer. This implements decoupling between service data transmission from the RLC entity to the MAC entity and service scheduling by the MAC entity and prevents that a rather high bandwidth is required between boards.

It should be noted that the MAC entity, RLC entity, RLC agent and the like in the embodiments of the present invention may also be called a unit, a module or the like, and is classified merely by functions or in logic. They may be specifically in a form of software, using a processor to execute program code to implement their functions; and may also be in a form of hardware, or in another form of a combination of software and hardware, which is not limited in the present invention. For example, in the apparatus embodiments corresponding to FIG. 3 and FIG. 4, the MAC entity 3011 and the RLC entity 302 may be separately implemented by using a processor to invoke a corresponding program or pure hardware, and the MAC entity 4011, the RLC entity 402, and the RLC agent 403 may be separately implemented by using a processor to invoke a corresponding program or pure hardware.

Based on the description in the foregoing embodiments, a person skilled in the art may be clearly aware that the present invention may be implemented through hardware, or firmware, or a combination thereof. When the present invention is implemented through software, the foregoing functions may be stored in a computer readable medium, or transmitted as one or more commands or code on the computer readable medium. The computer readable medium includes a computer storage medium and a communications medium. The communications medium includes any medium that facilitates transmission of a computer program from one place to another place. The storage medium may be any available medium accessible to a computer. The following is taken as an example but is not limited: The computer readable medium may include an RAM, an ROM, an EEPROM, a CD-ROM or other optical disc storage, a disk storage medium or other disk storage, or any other medium that can be used to carry or store an expected program code in a command or data structure form and can be accessed by a computer. In addition, any connection may appropriately become a computer readable medium. For example, if the software implements the transmission from a website, a server, or other remote sources by using a coaxial cable, an optical cable, a twisted pair, a digital subscriber line (DSL), or a wireless technology such as infrared, radio, or microwave, the coaxial cable, the optical cable, the twisted pair, the DSL, or the wireless technology such as infrared, radio, or microwave is included in fixation of a home medium. For example, a disk (Disk) and a disc (disc) used in the present invention include a compact disc (CD), a laser disc, an optical disc, a digital versatile disc (DVD), a floppy disk, and a blue-ray disc. Usually a disk magnetically duplicates data, while a disc optically duplicates data by using laser. A combination of the foregoing should also be covered in the protection scope of a computer readable medium.

In summary, the foregoing describes only exemplary embodiments of the technical solutions of the present invention and is not intended to limit the protection scope of the present invention. Any modification, equivalent replacement, or improvement made within the spirit and principle of the present invention shall fall within the protection scope of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A service scheduling method, comprising:
    reporting, by a Medium Access Control (MAC) entity of a carrier, bearer information of the carrier to a Radio Link Control (RLC) entity;
    allocating, by the Radio Link Control (RLC) entity, service data and control information to the carrier, and sending the service data and the control information to a data buffer of the carrier;
    determining, by the MAC entity, a user equipment that needs to be scheduled, and acquiring the service data and the control information from the data buffer; and
    performing, by the MAC entity, RLC packet assembly and MAC packet assembly on the service data; and sending the service data experiencing the packet assembly to the user equipment.

2. The method according to claim 1, wherein the bearer information comprises one or more of the following: quality of a channel corresponding to the carrier, a load of the carrier, and a rate that the carrier can provide for all user equipment.

3. The method according to claim 1, wherein the control information is a number of a logical channel, a sequence number, or a data length of the service data.

4. The method according to claim 1, wherein allocating service data and control information to the carrier further comprises:
    allocating, by the RLC entity, the service data and the control information to the carrier according to the bearer information, a data buffer status of the carrier, and a buffer status of the RLC entity.

5. The method according to claim 1, wherein performing, by the MAC entity, RLC packet assembly on the service data comprises:
    in response to radio link control packet data unit segment (RLC PDU segment) packet assembly being performed during a previous transmission time interval (TTI), performing RLC PDU Segment packet assembly;
    in response to only one sequence number (SN) being currently left and the service data being unable to be allocated in a current TTI at a time, performing RLC PDU segment packet assembly; and
    performing radio link control packet data unit (RLC PDU) packet assembly in response to RLC PDU packet assembly not being performed during a previous TTI, more than one SN being currently left and the service data being able to be allocated in in the current TTI at a time.

6. A base station, comprising:
    one or more processors; and
    one or more computer-readable storage mediums storing one or more programs to be executed by the one or more processors, the one or more programs including instructions that, when executed by the one or more processors, implement one or more Medium Access Control (MAC) entities and one or more Radio Link Control (RLC) entities; and
    a carrier, comprising a first MAC entity of the one or more MAC entities and a data buffer; and
    wherein the instructions to implement the one or more MAC entities include instructions to cause the first MAC entity of the one or more MAC entities to report bearer information of the carrier to a first RLC entity of the one or more RLC entities;
    wherein the instructions to implement the one or more RLC entities include instructions to cause the first RLC entity to allocate service data and control information to the carrier and send the service data and the control information to the data buffer; and
    wherein the instructions to implement the one or more MAC entities include instructions to cause the first MAC entity to determine a user equipment that needs to be scheduled, acquire the service data and the control information from the data buffer, perform RLC packet assembly and MAC packet assembly on the service data, and send the service data experiencing the packet assembly to the user equipment.

7. The base station according to claim 6, wherein the bearer information of the carrier comprises one or more of the following: quality of a channel corresponding to the carrier, a load of the carrier, and a rate that the carrier can provide for all user equipment.

8. The base station according to claim 6, wherein the control information is a number of a logical channel, a sequence number, or a data length of the service data.

9. The base station according to claim 6, wherein the instructions to cause the first RLC entity to allocate service data and control information to the carrier comprise instructions to cause the first RLC entity to:
 allocate the service data and the control information to the carrier according to the bearer information, a data buffer status of the carrier, and a buffer status of the first RLC entity.

10. The base station according to claim 6, wherein the instructions to cause the first MAC entity to perform RLC packet assembly on the service data comprise instructions to cause the first MAC entity to:
 in response to radio link control packet data unit segment (RLC PDU segment) packet assembly being performed during a previous transmission time interval (TTI), perform RLC PDU Segment packet assembly;
 in response to only one sequence number (SN) being currently left and the service data being unable to be allocated in a current TTI at a time, perform RLC PDU segment packet assembly; and
 perform radio link control packet data unit (RLC PDU) packet assembly in response to RLC PDU packet assembly not being performed during a previous TTI, more than one SN being currently left and the service data being able to be allocated in a current TTI at a time.

11. A base station, comprising:
 one or more processors; and
 one or more computer-readable storage mediums storing one or more programs to be executed by the one or more processors, the one or more programs including instructions that, when executed by the one or more processors, implement one or more Medium Access Control (MAC) entities, one or more Radio Link Control (RLC) entities, and one or more RLC agents; and
 a carrier, comprising a first MAC entity of the one or more MAC entities;
 wherein the instructions to implement the one or more MAC entities comprise instructions to cause the first MAC entity to report bearer information of the carrier to a first RLC entity of the one or more RLC entities;
 wherein the instructions to implement the one or more RLC entities comprise instructions to cause the first RLC entity to allocate service data and control information to the carrier and send the service data and the control information to a first RLC agent of the one or more RLC agents for buffering;
 wherein the instructions to implement the one or more RLC agents comprise instructions to cause the first RLC agent to buffer the service data and the control information; and
 wherein the instructions to implement the one or more MAC entities further comprise instructions to cause the first MAC entity to determine a user equipment that needs to be scheduled, acquire the service data and the control information from the first RLC agent, and send the service data to the user equipment.

12. The base station according to claim 11, wherein the bearer information comprises one or more of the following: quality of a channel corresponding to the carrier, a load of the carrier, and a rate that the carrier can provide for all user equipment.

13. The base station according to claim 11, wherein the control information is a number of a logical channel, a sequence number, or a data length of the service data.

14. The base station according to claim 11, wherein the instructions to cause the first RLC entity to allocate service data and control information to the carrier comprise instructions to cause the first RLC entity to:
 allocate the service data and the control information to the carrier according to the bearer information, a buffer status of the first RLC agent, and a buffer status of the first RLC entity.

15. The base station according to claim 11, wherein the instructions to cause the first MAC entity to, acquire the service data and the control information from the first RLC agent and send the service data to the user equipment comprise instructions to cause the first MAC entity to:
 send a service data allocation request to the first RLC agent, to cause the first RLC agent to perform RLC packet assembly on the service data and send the service data experiencing the RLC packet assembly to the first MAC entity; and
 perform MAC packet assembly on the service data experiencing the RLC packet assembly and sending the service data experiencing the MAC packet assembly to the user equipment.

16. The base station according to claim 15, wherein the instructions to cause the first MAC entity to perform RLC packet assembly on the service data comprise instructions to cause the first MAC entity to:
 in response to radio link control packet data unit segment (RLC PDU segment) packet assembly being performed during a previous transmission time interval (TTI), perform RLC PDU Segment packet assembly;
 in response to only one sequence number (SN) being currently left and the service data being unable to be allocated in a current TTI at a time, perform RLC PDU segment packet assembly; and
 perform radio link control packet data unit (RLC PDU) packet assembly in response to RLC PDU packet assembly not being performed during a previous TTI, more than on SN being currently left, and the service data being able to be allocated in a current TTI at a time.

17. The base station according to claim 11, wherein the instructions to cause the first MAC entity to acquire the service data and the control information from the first RLC agent and send the service data to the user equipment comprise instructions to cause the first MAC entity to:
 send a service data allocation request to the first RLC agent and receive the service data of the user equipment from the first RLC agent; and
 perform RLC packet assembly and MAC packet assembly on the service data of the user equipment and sending the service data experiencing the MAC packet assembly to the user equipment.

18. The base station according to claim 17, wherein the instructions to cause the first MAC entity to perform RLC packet assembly on the service data comprise instructions to cause the first MAC entity to:
 in response to radio link control packet data unit segment (RLC PDU segment) packet assembly being performed during a previous transmission time interval (TTI), perform RLC PDU Segment packet assembly;
 in response to only one sequence number (SN) being currently left and the service data being unable to be allocated in a current TTI at a time, perform RLC PDU segment packet assembly; and perform radio link control packet data unit (RLC PDU) packet assembly in response to RLC PDU packet assembly not being performed during a previous TTI, more than one SN being currently left, and the service data being able to be allocated in a current TTI at a time.

* * * * *